April 16, 1968 C. PATTERSON 3,377,634
DRAIN BASKET
Filed Feb. 14, 1967 3 Sheets-Sheet 1

CRANSTON PATTERSON
INVENTOR.

BY
ATTORNEY

April 16, 1968  C. PATTERSON  3,377,634
DRAIN BASKET
Filed Feb. 14, 1967  3 Sheets-Sheet 2
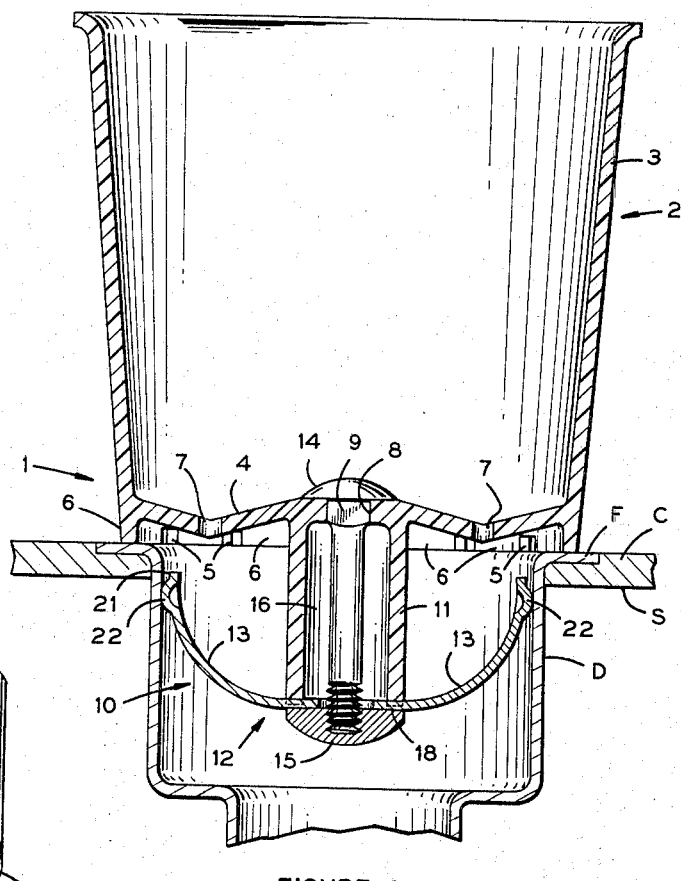
FIGURE 3
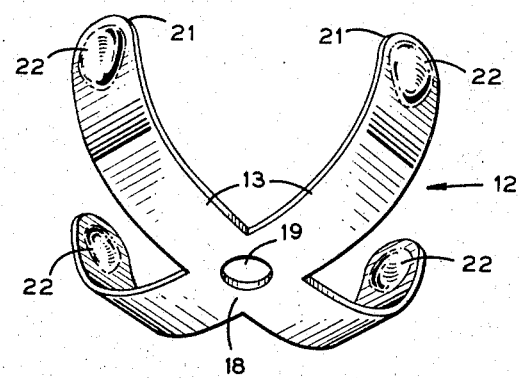
FIGURE 4
FIGURE 6
CRANSTON PATTERSON
INVENTOR.
BY *Roy H. Smith, Jr.*
ATTORNEY April 16, 1968 C. PATTERSON 3,377,634
DRAIN BASKET Filed Feb. 14, 1967 3 Sheets-Sheet 3

CRANSTON PATTERSON
*INVENTOR.*

BY *Roy H. Smith, Jr.*
ATTORNEY

United States Patent Office 3,377,63
Patented Apr. 16, 196

3,377,634
DRAIN BASKET
Cranston Patterson, 907 Heights Blvd.,
Houston, Tex. 77008
Continuation-in-part of application Ser. No. 467,652,
June 28, 1965. This application Feb. 14, 1967, Ser.
No. 615,939
5 Claims. (Cl. 4—290)

ABSTRACT OF THE DISCLOSURE

A drain basket for kitchenware which rests on the bottom of a kitchen sink and supports flatware disposed vertically between the basket and a sidewall of the sink while cutlery items are supported within the basket. Consists of an upstanding open top cup having a sidewall and a bottom wall, and a supporting structure depending from the bottom wall and into the drain of the sink. Radially resilient spring fingers on this supporting structure contact the wall of the sink drain to furnish the support needed to prevent toppling of the cup. Both the bottom wall and sidewall of the cup are provided with drainage openings, those in the sidewall being formed from its lower end to leave supporting feet between the openings.

Figure 1:
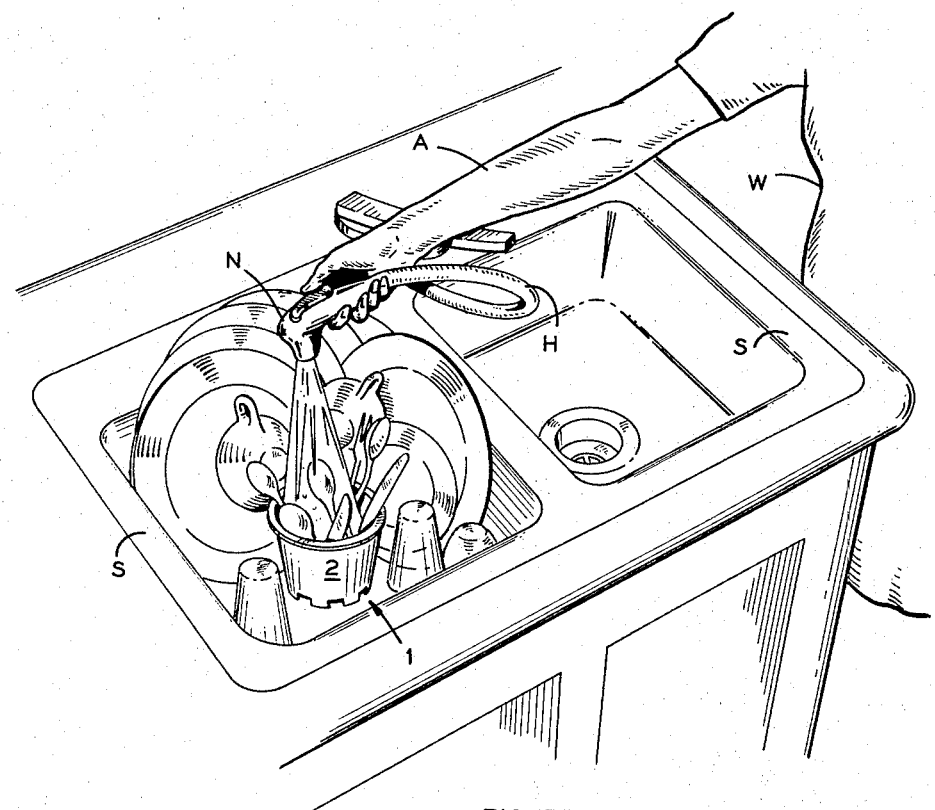

This application is a continuation-in-part of patent application 467,652, filed June 28, 1965, and since abandoned.

The present invention is a drain basket designed to be used in a kitchen sink primarily for the support of crockery, cutlery and utensils used in the preparation, serving and consumption of food and beverages. The drain basket supports such items while they are being rinsed to remove soap following a washing in a companion sink, and also during a drying period after such rinsing. It may also be used as a space for collecting dirty dishes prior to a soaping cycle, and may be used to support such dishes while they are pre-rinsed to remove major food particles to kep such particles out of the dish water. It may also be used to hold ice cubes, and may serve as a colander for the rinsing and draining of fruits, leafy vegetables and the like.

As used herein, the word "cutlery" is used to embrace all hand held eating implements, forks and spoons as well as knives, and similar implements used in the preparation and serving of food. Similarly, the word "kitchenware" is used inclusively of cutlery as thus broadly defined and dishware of all sorts, glassware, pots and pans, and other implements used in the preparation, serving and eating of food and beverages.

Heretofore kitchenware has commonly been washed in a sinkful of soapy water and allowed to dry in a wire rack or basket resting on a counter adjacent to the sink. In a single sink operation the soapy water is either not rinsed from the kitchenware or is rinsed therefrom by pouring clean hot water over the soapy items as they sit in the drain basket (or sometimes the operator holds the washed items one at a time under the hot water faucet before placing them in the rack). Where the now common twin sinks are available, the extra sink is commonly filled with clear hot water and the dishes are dipped in this water to remove the soap being placed in the drain rack. To avoid the accumulation of soap in the rinse water, the latter procedure is sometimes varied by not plugging the extra sink and using it as a space in which water from the hot water faucet is directed over the soapy dishes and allowed to run through the sink drain.

The drain rack heretofore used for such dish washing is typically an open top rectangular container, made of interwoven wires and provided with wire separators disposed to support a multiplicity of dishes in a more or less vertical, spaced-apart relationship. Usually a separate compartment is provided to support cutlery items in a approximately vertical position, and the legs of the rac usually support the kitchen ware above the surface of the counter. Almost laways the bottom of the rack is of the same interwoven wire construction as the sidewall with the result that the drain water runs through th rack to the counter below. When it is desired to prever the accumulation of such water, a separate drain boar must be provided, one with a sloping upper surface tha will permit drain water to flow into the sink.

One of the main disadvantages of such prior art drai racks is the fact that they take up counter space, creat ing a crowded, cluttered condition on the counter. An other drawback is that no use is made of the sink wall for the support of kitchenware, requiring investment in rack for complete support of the dishes during the dryin cycle. This rack is relatively large and a similarly larg space adjacent the sink must be provided for its storag when it is not in use.

A third disadvantage lies in the difficulty of rinsin articles supported in such a dish rack by pouring hot wate over them from a container such as a sauce pan, or b directing a stream of hot water on them from a hose an spray nozzle. It is virtually impossible to accomplish such rinsing without splashing a certain amount of water ove the operator and nearby areas of the counter, a resul which is both unpleasant to the operator and makes a messy condition on the counter. Even if water is no poured or sprayed over the kitchenware as it rests in the rack, water dripping from the wet items accumulates or the counter underneath the rack and trickles from a poo to adjacent areas, or additional equipment such as drain board must be provided to direct such water to the sink The principal object of the present invention is to provide a drain basket obviating most or all of the above delineated disadvantages of prior art interwoven wire drain baskets. Another object is to provide a drain basket which does not have to be set on the counter adjacent a kitchen sink, thereby saving this space for other employments. A third object is to provide a dish drain which cooperates with a kitchen sink to support kitchenware in rinsing and draining positions, thus reducing the size and cost of the dish drain structure. A fourth object is to provide a dish drain used in a position where a stream of hot water may be sprayed on the kitchenware supported in and adjacent the drain basket without splashing water over the person holding the spraying mechanism, nor over the counter space adjacent the kitchen sink in which the drain basket is utilized. A fifth object is to provide such a drain basket which may be used for the rinsing and draining of food items as well as kitchenware.

The above objects are accomplished by providing a simple open top cup having attached to its lower end an infrastructure which engages the sink drain of a kitchen sink to firmly support the cup directly over the sink drain. Cutlery items are then supported within the cup by leaning them against the sidewall of the cup with their ends supported by the bottom of the cup.

Dinner plates and other flat members are formed into a vertical stack with their edges contacting the sink bottom and with the inside plate of the stack contacting the sidewall of the cup while the outside plate contacts the vertical sidewall of the sink itself. Flatware and cutlery thus disposed may be rinsed in a single step by spraying hot water over them, but concave or hollow items such as drinking glasses, coffee cups, pots and pans and similar items require the usual preliminary rinse to clean their interiors and a second rinse of their outer surfaces. In the rinsing of mixed kitchenware with the drain basket of the present invention, probably the quickest procedure is to stack all the cutlery and flatware without rinsing them, then set the hollow items upright on the bottom of the sink and rinse their inner surfaces, and finally invert the concave items and rinse their exterior surfaces at the same time that the flatware and cutlery are rinsed.

The infrastructure or supporting structure of the drain basket of the invention is one that depends from the open cup and is securely attached thereto, extending downwardly into the sink drain and engaging its interior surface with sufficient tightness that the drain basket cannot be toppled over even when non-uniformly loaded, as by a stack of flatware disposed at only one side of the open cup. Preferably this supporting structure is of a type that can readily be engaged with and disengaged from the sink drain, as by simply pushing it into the sink drain and pulling it upwardly at the conclusion of a drying operation. This simple way of installing and removing the drain basket of the invention avoids the necessity of making adjustments, and the delays attendant thereon.

In the preferred embodiment illustrated in the accompanying drawing and more completely described below, the supporting structure has the form of a multiplicity of arcuate spring members having their concave surfaces facing upwardly and inwardly toward the bottom and center of the cutlery cup. Each spring member encompasses approximately 90 degrees of arc and has one end secured to a central hub extending downwardly from the cup while the outer end is free and presses against the inner surface of the sink drain. With this arrangement the spring fingers are radially resilient or flexible to engage sink drains of various diameters, and yet will engage the largest diameter drain for which the drain basket is designed with sufficient firmness to keep it in a firm, upright position.

An important feature of the invention is the drainage openings in the open cup, openings that permit water to drain both downwardly through the bottom of the cup and laterally through the sidewall of the cup. The side openings take the form of grooves formed in the lower end of the sidewall, such grooves being circumferentially spaced from one another to leave a multiplicity of feet which support the cup on the sink bottom or on the upper surface of the flange which forms the upper terminus of the sink drain. Such openings insure complete drainage and maximum sanitation by preventing any accumulation of drain water, causing the water to run off into the sink drain as quickly as it drains from the dishware disposed about the drain cup.

Figure 2:
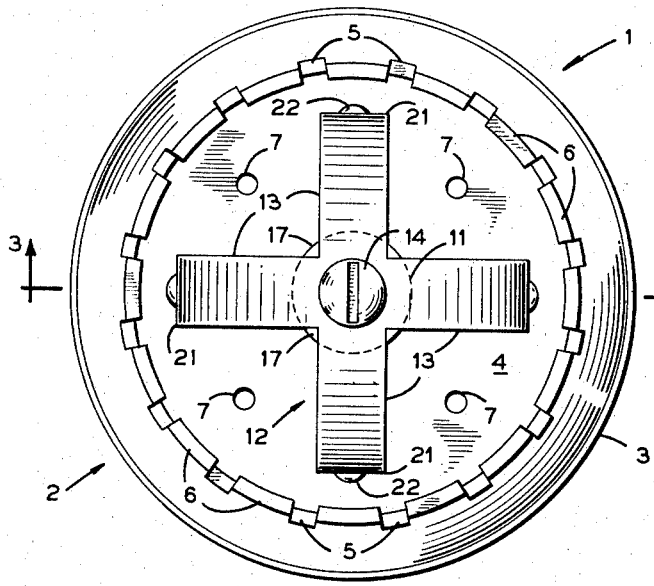
Figure 5:
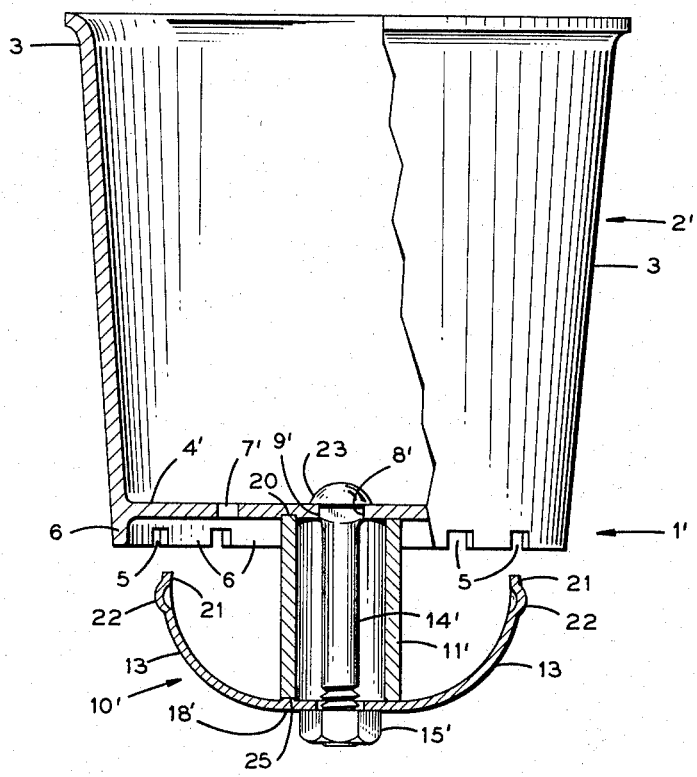

The invention may perhaps be more readily understood by referring to the accompanying drawing, in which:

FIGURE 1 is a perspective view of a double sink with a drain basket of the present invention in operative position in one of the twin sinks, FIGURE 2 is a bottom view of a preferred form of the drain basket of the invention, FIGURE 3 is a vertical section of the drain basket of FIGURE 2, as indicated by the lines and arrows marked 3—3, showing the basket as supported in a sink drain, this form having a spring supporting hub formed integrally with the upstanding drain cup, FIGURE 4 is a fragmentary perspective view of a detail of the FIGURE 2 embodiment, showing the bottom end of the spring supporting hub, FIGURE 5 is a vertical section of a slightly different embodiment, one in which the spring supporting hub is made as a separate piece and is secured to the cutlery cup by the same bolt which fastens the spring to the hub, and FIGURE 6 is a perspective view of a preferred form of spring, one that may be used with either of the illustrated drain baskets.

Referring to FIGURE 1, a drain basket 1 of the invention is shown in operative position at the bottom of one sink S of a twin kitchen sink. A stack of dishes is shown in a more or less vertical disposition between the outside of the upstanding cup 2 and the inside surface of the sidewall of the sink, and a multiplicity of cutlery items are shown supported on the inside of cup 2. A housewife W having arm A is shown holding an extensible flexible hose H terminating in a spray device or nozzle N from which a stream of hot water is being projected over the kitchware.

As shown in FIGURES 2 and 3, cup 2 consists of a sidewall 3 and bottom wall 4, the latter preferably joining the former at a point spaced slightly above the lower end of the sidewall 3 to simplify the forming of drainage openings 5 through the sidewall. These lateral drainage openings are circumferentially spaced about the lower end of the sidewall and extend through such end to leave a like number of supporting feet 6 which rest on the flange F of the sink drain D to furnish some of the support for the drain basket. Bottom wall 4 of the cup also has a number of openings 7 extending downwardly therethrough, and the wall is preferably contoured as indicated to direct drain water into openings 7.

In this embodiment the infrastructure 10 comprises hub 11, an elastic metal spring 12 having fingers 13, a headed bolt or screw 14, and nut 15. Hub 11 is made integral with cup 2, both preferably being formed of a semi-rigid plastic material such as nylon, polyethylene or polystyrene. Hub 11 contains central opening 16 joining a central opening 8 in bottom wall 4, opening 8 preferably being square to accommodate a square portion 9 of bolt 14 to prevent the bolt from turning. As shown in FIGURE 4, the lower end of hub 11 is preferably cut away to provide the downwardly projecting ears or lugs 17. The chordal distance between each pair of adjacent lugs 17 is equal to or only slightly greater than the width of a spring finger 13, and the spring 12 is assembled to hub 11 with each of the spring fingers 13 lying in one of spaces between a pair of adjacent lugs 17. While such lugs are not essential, they do prevent rotation of the spring and loosening of the assembly. It is of some importance that the spring be kept quite tightly fastened to the cup of the drain basket, as a loose spring will interfere with ready insertion and removal of the basket and will permit the tilting and even toppling of the cup.

It should also be noted that, as nut 15 is tightened on bolt 14, a water resistant seal is formed between the lower end of hub 11 and the center part 18 of spring 12. This seal effectively excludes water from central opening 16 of the hub, thus preventing the collection of any stagnant water inside such opening.

The preferred form of spring 12 is illustrated in FIGURE 6, which shows four spring fingers 13 extending outwardly from a common center portion 18. Such center portion is thus an integral part of each finger, and has a center opening 19 to receive the threaded body of bolt 14, preferably with a slight clearance to prevent binding of the spring against the threads of the bolt. Each of the spring fingers 13 is essentially identical to the others in shape and dimensions, extending outwardly and upwardly from their common center in an arc having a center lying on the center line of hole 19. Each finger terminates in a free end 21 which can be pressed radially inwardly as the infrastructure is pushed down into a sink drain, and the resulting counterpressure exerted by the fingers on the spring drain secures the drain basket in a fixed position in the sink. Each free end 21 is preferably provided with a circular dimple 22 extending radially outwardly to minimize the area of frictional contact between spring and sink drain. The spring fingers are preferably uniformly circumferentially spaced about the axis of the spring, i.e., on 90° centers for the 4-spring embodiment illustrated. In installed position, the length of arc encompassed by each finger between the common fixed end 18 and free end 21 is about 90 degrees, thereby making the tangent at the free end approximately parallel to the vertical sidewall of the sink drain and making maximum use of the spring force by causing it to be exerted normal to the surface of the drain.

The preferred shape and disposition of all members of infrastructure 10 is one based on symmetry about the vertical center line of the usual cylindrical sink drain D. Spring 12 and its opening 19 are symmetrically formed and disposed on this same center line, and the same is true of hub 11 and its opening 16. With such cylindrical symmetry there is no need for aligning the drain basket circumferentially with respect to the sink drain, as one circumferential disposition is as good as any other. All that is required in mounting the drain basket is to hold it in vertical position above the sink drain with its center line lying approximately on the extended center line of the sink drain, then push the basket down until dimples 22 of the spring fingers come into contact with the cylindrical surface of the drain, continuing this downward motion until feet 6 of cup 2 are firmly seated on flange F of the sink drain. The symmetrical form and disposition of the spring makes the entire assembly self centering.

The alternate embodiment 1' shown in FIGURE 5 differs from that already described primarily in that its hub 11' is a separate member. It is secured to the bottom wall 4' of cup 2' by bolt 14' and nut 15', the bolt body preferably having a square part 9' seated in a square central hole 8' in wall 4'. To prevent the hub from turning, its upper end is preferably provided with a multiplicity of upstanding spaced lugs 20 which are received in similarly spaced recesses in the lower surfaces of bottom wall 4. The lower end of bolt 14' also passes through the central opening 19 of spring 12, so that tightening of nut 15' has the effect of clamping hub 11' and spring 12 between the nut and the bottom wall 4' of the cup. Small lugs or projections 25 on the upper surface of spring central portion 18' are also received in registering spaced depressions on the bottom end of hub 11' to prevent the spring from rotating relative to the hub. In other respects the drain basket 1' is essentially the same as drain basket 1, identical numbers being used for identical parts and a prime being added when the parts differ in some manner, however insignificant.

The specific drain baskets above described are fully capable of effecting the objects of the invention set forth near the beginning of this specification. Each may be set in place to cooperate with the walls of a sink in supporting flatware, cutlery, crockery and similar items. Such kitchenware are thus supported in as low a position as possible and may be sprayed vigorously with the hottest water available to effectively rinse and sterilize them. There is no splashing of hot water on the operator or the counter adjacent the sink. No counter space is preempted, and all of it is available for other uses. There is no dripping of drain water on a counter and no trickling of it over a counter area to dampen nearby objects, but on the other hand all drain water either passes directly through the bottom wall of the drain cup or runs across the sink bottom, through the lateral drainage openings of the cup and into the sink drain. Hotter water may be used for this operation, with the result that the kitchenware dries faster and may be put away sooner than heretofore to make the sink available for other purposes. If one such purpose happens to be the preparation of a food which requires washing, the drain basket may be left in place and used as a colander; the basket is quite sterile as a result of its primary employment with only very hot water.

While only a limited number of specific drain baskets have been illustrated and described, it will be apparent that the general concept of an open cup or basket resting on a sink bottom and further supported by resilient means pendent from the bottom of the cup and engaging the surface of the sink drain may be expressed in a wide variety of structures. The cup may have a wide variety of shapes and dimensions, e.g., it may be similar to the sink in square or rectangular contour and having each of i four sides spaced from the corresponding sink walls t distribute flatware in each of the four spaces; in such a enlarged cup the interior space may be divided into com partments by partition walls and some of the compar ments may be used to hold such items as glasses and cup while others are used to support cutlery (note also the simple upstanding pegs may be provided to hold hollo items such as glasses in inverted position for better dry ing). With such an expanded drain cup there is littl danger of toppling, and thus the spring engaging the sin drain may be reduced in strength while still serving centering function, or it may even be omitted altogethei Complete omission gives the obvious advantage that th basket and contents may be readily moved and used o other flat surfaces, including those having no drain open ing.

Similarly the supporting structure, when used, may hav many shapes and sizes so long as it extends down into th sink drain from the bottom of the cup and resiliently en gages the interior surface of the drain to hold the cup up right as it rests on the sink bottom and supports a loa of kitchenware. A central hub supporting a group of ar cuate spring fingers has been described, but as an instanc of another suitable structure there is a multiplicity of cir cumferentially spaced vertical spring fingers extendin down directly from the outer part of bottom wall of cup or basket. These spring fingers could be more or les flat and vertical over their upper portions and bow out wardly over their lower portions to contact the sink drai at about the maximum diameter of the box. Such struc ture would obviously provide the desired radial resiliency Many different materials may be used for both cup anc spring. One of the fairly rigid, easily extruded plastics i preferred for the cup in order that the cost of this item and thus the cost of the entire assembly may be reduced for the benefit of both manufacturer and purchaser. In the interest of durability and proof against accidental breakage, the spring is best made of metal, preferably a non-rusting metal such as stainless steel, but it may also be made of extruded plastic.

What is claimed is:

1. In a kitchen sink having sidewalls, a bottom and a drain below said bottom and surrounding an opening therein, a drain basket resting on said sink bottom above said drain, said drain basket comprising (1) an open top cup having at least one sidewall forming a complete enclosure and an integral bottom wall extending across said enclosure at about the lower end thereof, both said walls having drainage openings therethrough, the drainage openings in said sidewall being formed from the lower end thereof below said bottom wall and circumferentially spaced to leave alternating spaced feet which rest on said sink bottom to at least partially support said drain basket and (2) a spring secured to and spacedly supported below the bottom of said cup, the spring having a multiplicity of circumferentially spaced, upwardly directed, radially resilient spring fingers yieldingly contacting said sink drain and exerting force thereon to secure said cup in an upright position.

2. In a kitchen sink having a bottom, sidewalls attached to the bottom and extending upwardly therefrom, and a drain attached to and extending below the bottom, the improvement comprising a drain basket for supporting kitchenware to be rinsed between itself and said sidewall of the sink, said drain basket comprising a cup resting on said sink bottom above the drain, said cup having an open top, a sidewall and an upwardly spaced bottom wall, and also comprising a spring secured to and spacedly pending below said bottom wall, said spring having a multiplicity of upwardly directed, radially resilient fingers yieldingly contacting said sink drain to secure the drain basket to the sink, said cup having openings through both its bottom wall and its sidewall for the flow of water into the sink drain, said resilient fingers at their points of ontact with said drain being outwardly dimpled to minimize the area of contact and thus concentrate the spring force.

3. A drain basket comprising an upwardly opening hollow cup having a sidewall and a bottom wall adapted to support cutlery and an infrastructure secured to and depending from said bottom wall of the cup, said bottom having a number of drainage openings downwardly therethrough and said sidewall at its lower end having a number of lateral drainage openings therethrough, said infrastructure comprising a supporting hub and a spring supported on said hub, said spring having a multiplicity of radially resilient fingers extending outwardly and upwardly from said support and terminating in free ends, said drain basket being adapted to sit on the flange of a sink drain with said infrastructure extending down into said drain with said free ends of the spring in elastic contact with the inner surface of said drain.

4. A drain basket adapted for use in a kitchen sink having a bottom, sidewalls extending up from said bottom and a drain secured to and extending below a drain opening in said bottom, said drain basket comprising a cup and a spring supported from and extending below said cup inside the sink drain, said cup having an open top, a sidewall, a bottom wall secured to said sidewall adjacent the bottom edge thereof, and a central hub integral with said bottom wall extending below it and terminating in an unsupported lower end, both said bottom wall and said sidewall having drainage openings therethrough, said spring having a central portion secured to said lower end of the hub and a multiplicity of resilient arcuate fingers extending outwardly and upwardly from the central portion and yieldingly contacting said sink drain to secure said drain basket to the sink.

5. A kitchen drain basket comprising an upwardly extending kitchenware supporting cup and an infrastructure pendent from and secured to said cup, said cup having an open top, a sidewall with a bottom edge containing a number of circumferentially spaced lateral drainage openings separated by supporting feet, and a bottom wall extending across the lower end of the sidewall above the drainage openings and having a number of openings therethrough for the drainage of water from within the cup downwardly to the space below the bottom, said infrastructure comprising a multiplicity of radially extending curved spring fingers and a hub means supporting such spring fingers, said spring fingers curving outwardly and upwardly from the hub and being radially flexible from their radially outer extremities and being thereby adapted to engage a sink drain to support said cup with its feet resting on the bottom of the sink above and surrounding said drain.

References Cited
UNITED STATES PATENTS

| | | | |
|---|---|---|---|
| 782,860 | 2/1905 | Lever | 4—292 |
| 862,570 | 8/1907 | MacDonald | 4—290 |
| 2,002,113 | 5/1935 | Hunt | 4—290 |

HAROLD J. GROSS, *Primary Examiner.*